United States Patent [19]

Maust

[11] 4,226,566
[45] Oct. 7, 1980

[54] BEET HARVESTING MACHINE

[76] Inventor: Gale E. Maust, 8669 Pigeon Rd., Bay Port, Mich. 48720

[21] Appl. No.: 891,613

[22] Filed: Mar. 30, 1978

[51] Int. Cl.$^2$ ............................ B60P 1/36; B60P 1/40
[52] U.S. Cl. .................................. 414/519; 414/502; 171/58; 198/534
[58] Field of Search ............... 214/83.18; 105/376; 193/4, 5, 17, 32; 221/261; 171/58; 222/504, 557; 198/530, 534, 557, 616; 414/502, 519

[56] References Cited

U.S. PATENT DOCUMENTS

| 693,465 | 2/1902 | Treadwell | 198/534 |
|---|---|---|---|
| 1,098,108 | 5/1914 | Hager | 222/290 |
| 3,097,711 | 7/1963 | Clark | 222/504 |
| 3,102,603 | 9/1963 | Kerr | 222/504 |
| 3,371,826 | 3/1968 | Speno | 222/504 |
| 3,695,360 | 10/1972 | Hook et al. | 171/58 |
| 3,809,164 | 5/1974 | Hook et al. | 171/58 |
| 4,044,837 | 8/1977 | Haverdink | 171/58 |

Primary Examiner—Stephen G. Kunin
Assistant Examiner—Lawrence E. Williams
Attorney, Agent, or Firm—Gordon W. Hueschen

[57] ABSTRACT

The specification describes a beet harvesting machine having apparatus for digging the beets and apparatus for elevating them either to a truck or to a holding tank in which the holding tank is provided with a horizontal conveyor for discharging the beets from the holding tank and with a downwardly and inwardly sloping front wall which terminates short of the horizontal conveyor and the bottom portion of which is hinged on a horizontal axis so that it can be swung to a vertical position to minimize the opening between the front wall and the horizontal conveyor or to a forward extended position to maximize the opening between the front wall and the horizontal conveyor.

22 Claims, 7 Drawing Figures

BEET HARVESTING MACHINE

FIELD OF INVENTION AND PRIOR ART

This invention relates to improvements in beet harvesting machines and is particularly directed to improvements in beet harvesting machines of the type in which beets are dug, freed of dirt and stones, and elevated either to a truck or a holding tank and in which means is provided for feeding beets from the holding tank back to the means for elevating them to the truck.

Beet harvesters of the class described are exemplified in the John Deere Beet Harvester 4310. The holding tank has a horizontal conveyor at the bottom thereof and a backwardly and downwardly sloping front wall which terminates above the horizontal conveyor so that, when the horizontal conveyor is activated, beets are fed out under the front wall into the means for elevating them to a truck which follows alongside of the beet harvesting machine.

Beet harvesters of this character have the disadvantage that they are not flexible enough to accommodate the differing conditions which exist during beet harvesting. Thus, such beet harvesting machines are not well adapted to accommodate variations in the harvest, such as the size and quantity of the beets or the variations in the condition of the soil, whether wet and muddy, dry and hard, or semi-frozen.

OBJECTS OF THE INVENTION

It is an object of the invention to provide an improved beet harvesting machine of the class described. It is an object of the invention to provide a beet harvesting machine of the class described in which the feed from the holding tank can be adjusted to suit the conditions obtaining during harvesting. It is a further object of the invention to provide a beet harvesting machine of the class described having an adjustable gate for regulating the flow of beets from the holding tank to the elevating means. It is a further object of the invention to avoid the disadvantages of the prior art and to obtain such advantages as will appear as the description proceeds.

BRIEF DESCRIPTION OF THE INVENTION

The invention is directed to beet harvesting machines of the type in which beets are dug, freed of dirt and stones and elevated to a truck or holding tank in which the holding tank has a backwardly and downwardly sloping front wall which terminates above a horizontal conveyor which, when actuated, functions to remove beets from the holding tank, and is particularly directed to improvements therein in which the bottom portion of the front wall is hinged on a horizontal axis lying substantially in the plane of the front wall to provide a gate adapted to swing forward and backward from its normal position in the plane of the front wall to a forward position where it forms an acute angle with the vertical plane through the axis and in which means is provided for moving the gate from one extreme position to the other and holding it in either position or in any intermediate position so that, when the gate is moved to a vertical position, the clearance between the bottom of the gate and the top of the horizontal conveyor is reduced to a minimum, and when it is moved from that position to the extreme forward position, the clearance is maximized.

Advantageously, the means for moving the gate and holding it in the desired position is a hydraulic means, preferably one which comprises a double-acting piston in which the piston is moved by feeding hydraulic fluid to one side and simultaneously withdrawing it from the other side and in which, when the hydraulic fluid is not being fed and withdrawn, the fluid in the cylinder effectively prevents movement of the piston thereof either way, and in which a piston rod communicates the motion of said piston to said gate, whereby said gate is held immovable in any position to which it may have been moved.

Advantageously, the horizontal conveyor extends to a point between the normal position of the gate and the extended position thereof, preferably it has a sprocket means at the forward position so located that its axis and the axis of the gate are substantially parallel and lie substantially in the same vertical plane.

Advantageously, the front wall of the holding tank has extended portions extending downwardly alongside of the gate when the gate is in the normal position, so that the gate in the normal position, together with the extended portion, functions precisely as the downwardly and backwardly sloping front wall of the prior art. Since, when the gate is moved to its extended portion, there are angular openings between the extended portions and the ends of the gate, means are provided for keeping these openings blocked when the gate is in any extended position beyond the normal position.

Advantageously, this blocking means comprises a plate fastened to an extended portion and projecting forwardly as far as the gate in its extended position, and having an expanse sufficient to prevent beets and rocks from lodging in between the gate and the extended portion when the gate is swung backwardly toward its normal position. Alternatively, the blocking means may comprise a plate fastened to the end of the gate, which projects rearwardly far enough so that, when the gate is in its extended position, the plate extends back to the extended portion of the front wall. In this case, the plate should have an expanse sufficient to prevent beets and rocks from lodging between the gate and the extended portion of the front wall when the gate is swung backwardly toward the normal position.

The latter form can be used advantageously in connection with the hydraulic cylinder used to move the gate. Thus, the plate which is fastened to the end of the gate is extended forward and provided with means for attaching the piston rod of the hydraulic cylinder thereto. It will be understood, however, that both of the deflective plates can be fastened to the extended portions of the front wall or, that both of them can be fastened to the ends of the gate. In case they are both fastened to the extended portions of the front wall, other means will be mounted on the gate for attaching the piston rod of the hydraulic means thereto.

Advantageously, each extended portion has a plate fastened thereto and extending into the holding tank and which slopes downwardly and inwardly from the side walls of the tank to a position over the horizontal conveyor in order to direct the beets from the tank onto the conveyor. These plates, together with the back wall and the front wall of the holding tank, function as a hopper to deliver the beets from the holding tank to the horizontal conveyor.

Advantageously, the harvester has a frame member extending along each side, from front to rear, substantially at the level of the horizontal conveyor which is utilized to mount a bracket which projects inwardly and upwardly to an elevation intermediate the bottom of the gate in its lowermost position and the top thereof. The hydraulic cylinder has one end fastened to the top of this bracket and the other end fastened to the gate. By having the hydraulic cylinder fastening means on the gate comprised in the rock-deflecting plate which is welded or otherwise attached thereto, the attaching means will be the nearest possible to the frame member, so that the distance the bracket will have to extend inwardly from the frame member is minimized.

Advantageously, the hydraulic cylinder mounting bracket comprises a bracket plate shaped substantially as an isoceles triangle having its base secured by welding, or otherwise, to the frame member and its apex provided with means for fastening the hydraulic cylinder thereto. The bracket plate can be made of lighter stock if reinforcing plates, shaped substantially as scalene triangles having an obtuse angle are welded or otherwise fastened thereto, with one of the sides which subtend the obtuse angle being fastened to the bracket plate and the other to the frame member, with the reinforcing plate normal to the bracket plane and the frame member. Advantageously, a narrow reinforcing strip is fastened to the plate bracket and extends up from the frame member to a point above the apex of the bracket plate and is provided at the top thereof with means for attaching the hydraulic cylinder thereto.

Advantageously, the bottom of the gate is provided with means whereby the size of the minimum aperture between the gate and the horizontal conveyor can be adjusted. Thus, when the gate is swung to the vertical position and the feed from the holding tank is too fast for the conditions obtaining, the adjustable means can be set to reduce the size of the opening and thus cut down the flow of beets. Advantageously, the adjusting means comprises an elongated plate fastened to the inside wall of the gate which is provided with means for setting it in one or more positions, ranging from the bottom of the gate to a position below and parallel thereto. Advantageously, the plate is provided with a plurality of vertical slots and the plate is bolted to the gate through these slots, whereby the position of the plate depends upon whether the plate is bolted to the gate with the bolts in the top of the slots or at the bottom thereof, or at an intermediate position.

DETAILED DESCRIPTION OF THE INVENTION

Figure 2:
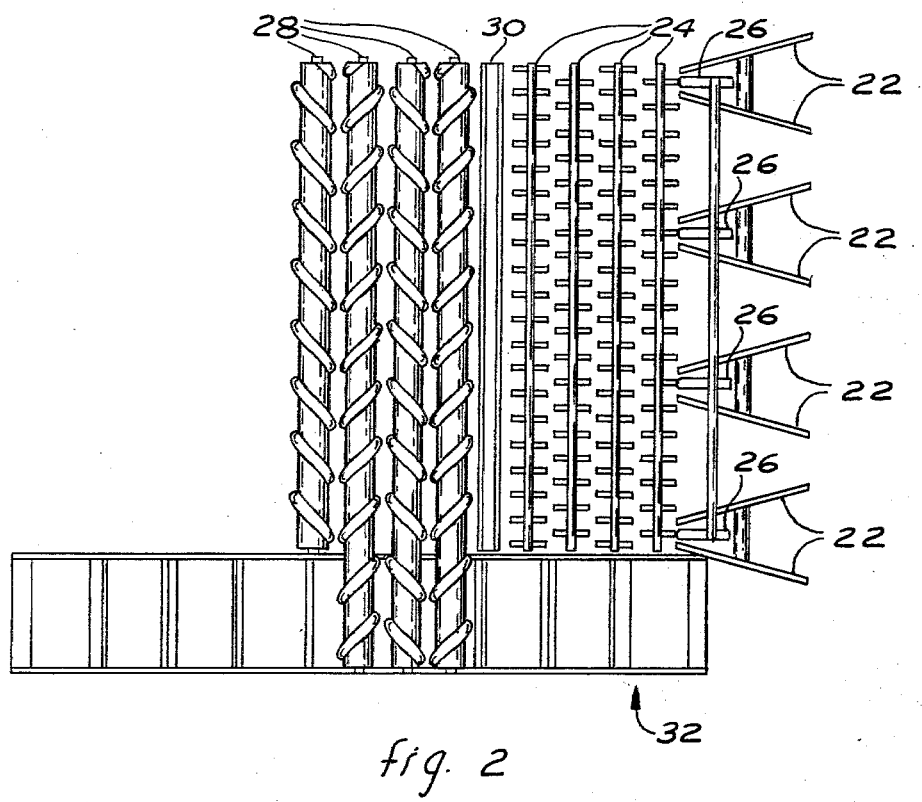
FIG. 2 is a detailed view of the digging and conveying mechanism of FIG. 1, looking along lines 2—2 of FIG. 1.
Figure 1:
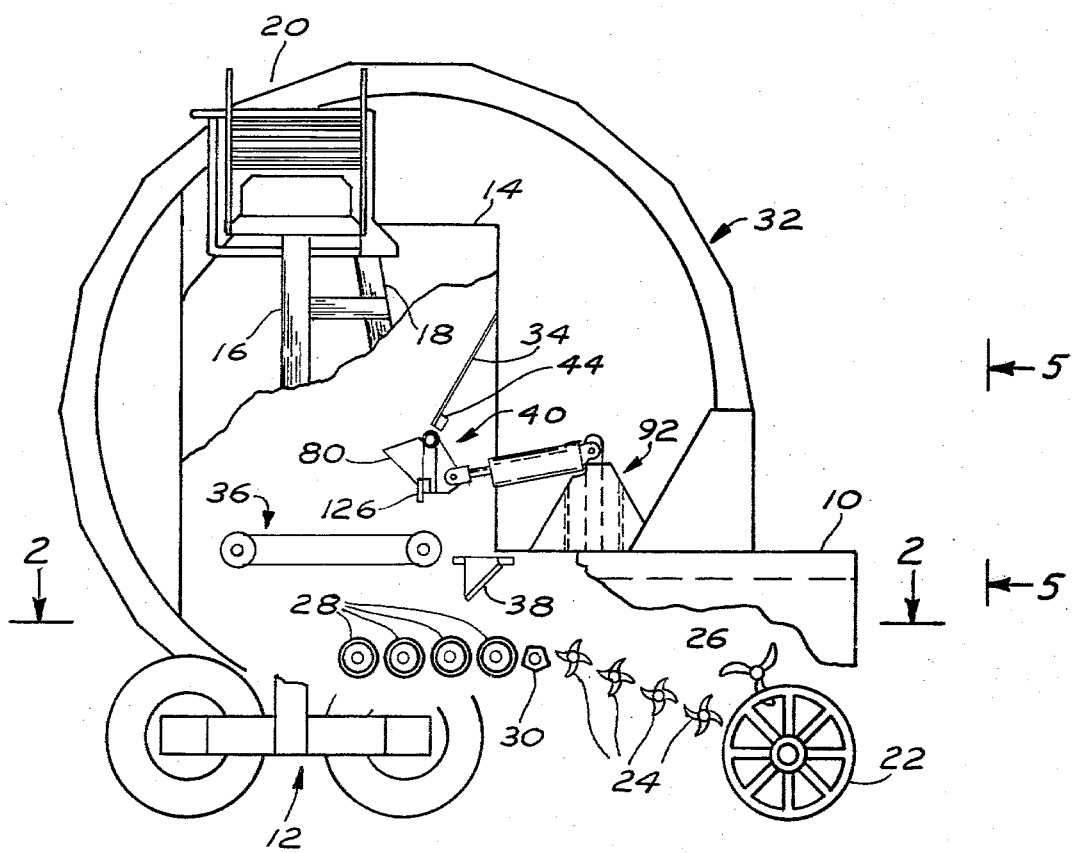
FIG. 1 is a side elevation showing a John Deere Beet Harvester 4310 modified according to the invention. Parts are broken away and parts of the prior art device are stylized.

In FIG. 1 there is illustrated, in a more or less schematic manner, the beet harvestor of the John Deere 4310 type, which has been modified in accordance with the invention. This harvester comprises longitudinal frame members 10 which are supported by the tandem wheel assembly 12. Supported on the longitudinal frame members 10 is a holding tank 14. Supported on the holding tank 14 and on the vertical supports 16 and 18, which rest on the frame 10, is a transverse conveyor 20 adapted to deliver beets either to the holding tank 14 or to a truck running alongside of the harvesting machine. The beets are dug by the plows 22, are transferred to the star wheels 24 by the kickers 26 where the dirt and rocks are largely dislodged from the beets. The beets are then transferred from the star wheels 24 to the transverse screw conveyors 28 by the transfer roll 30. Once on the screw conveyors 28, the beets are transferred transversely or laterally, where they are discharged into the conveyor means 32, commonly referred to in the art as a Ferris wheel. This Ferris wheel rotates on and by means not shown and functions to elevate the beets to the transverse conveyor 20 from whence they are delivered either to the holding tank 14 or to a truck running alongside of the harvester.

Figure 4:
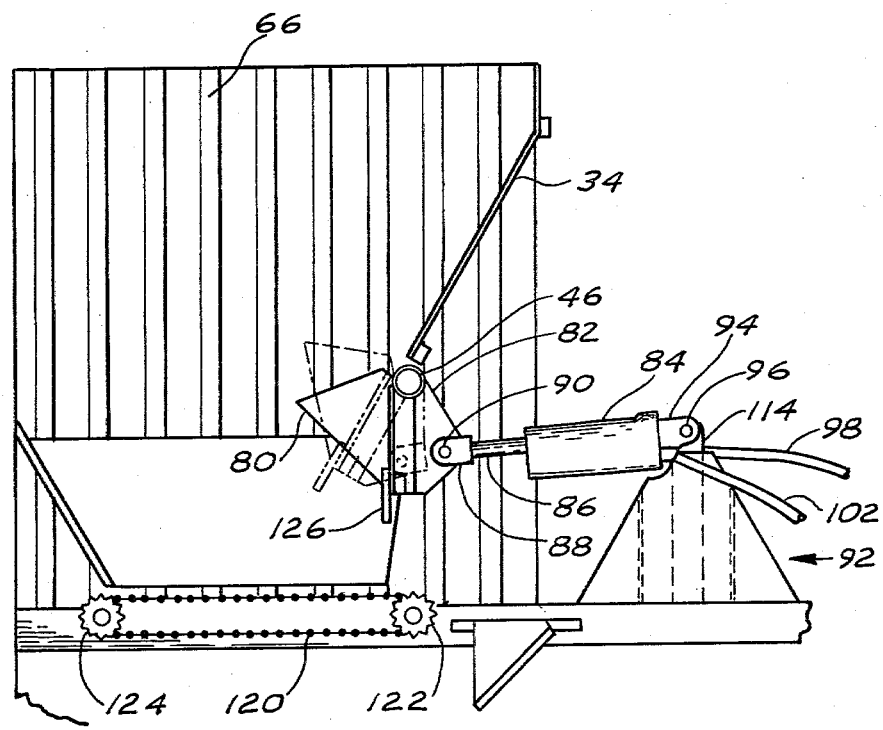
FIG. 4 is a side elevation showing the harvester modified according to the invention, looking along lines 4—4 of FIG. 5.

The holding tank 14 has a front wall 34 which slopes backwardly and downwardly, as shown in FIGS. 1 and 4, and a horizontal conveyor 36 at the bottom thereof. When the horizontal conveyor 36 is activated, the beets are moved forward and discharged onto the screw conveyors 28 so that they move over to the elevator 32 and on up to the transverse conveyor 20, whence they are transferred to the truck running alongside. An adjustable deflecting plate 38 is provided to prevent the beets being fed from the holding tank going on over onto the star wheels.

All that has been described thus far is characteristic of the prior art except that in the prior art the front wall 34 extends down closer to the horizontal conveyor 36.

In accordance with the invention, the bottom portion 40 of the front wall 34 is cut off and hinged on a transverse axis 42. The bottom portion of the front wall is reinforced by the transverse tubular member 44 and the cut-off portion 40 is welded to the large pipe 46 which is journaled in wear plates 48 and 50 which are welded to the side walls 52 and 54, respectively, of the holding tank 14. The reinforcing plates 48 and 50 are also welded to the vertical supports 18 by the triangular pieces 56.

The cut-off portion 40 is welded to the pipe or tube 46 and is reinforced by end pieces 58 and 60 which are welded to the pipe 46 and to the tubular reinforcing bottom member 62 which was part of the original front wall. Additional reinforcing members 64 are provided at intermediate points and, like the end pieces 58 and 60, are welded to the cut-off portion 40, the tubular reinforcing member 62, and the pipe 46. The members 66 are tubular vertical reinforcing members forming part of the side, front, and rear walls of the holding tank.

The cut-off portion 40 is thus formed into and functions as a gate adapted to swing about the horizontal transverse axis 42, from the normal position shown in the dotted lines in FIG. 4, which was the original position of the front wall, to the vertical position, as shown in FIGS. 1 and 4, to an extended forward position in which the gate forms an acute angle with the vertical.

When the gate 40 is swung to the vertical position shown in FIG. 4, the opening between it and the horizontal conveyor 36 is minimized, and when it is swung to the extreme forward position, the opening is maximized. This makes it possible to adjust the opening through which the beets are discharged from the holding tank 14, in accordance with the conditions which obtain at the time of the harvesting, depending on whether the stand of beets is heavy, whether the beets are small or large, and whether the plowing is easy or difficult because of the condition of the soil.

When the gate 40 is cut out of the front wall 34, it should be substantially coextensive with the width of the horizontal conveyor 36. This leaves lateral extensions 68 and 70 which are adjacent each end of the gate 40. Welded to the inner side of these extensions are plates 72 and 74 which extend downwardly and inwardly from the side walls 52 and 54, respectively, to a position over the horizontal conveyor 36, so that the beets in the holding tank are directed onto the conveyor. Also welded to the extension 68 is a plate 76 which has a bent bottom portion 78 adapted to overlie the plate 72. The plate 76 extends forward beyond the extension 68 a sufficient expanse to cover the opening which would otherwise be formed when the gate 40 is in the fully-extended position, that is, the opening between the gate and the extended portion 68. The plate 76 thus functions as a blocking means to prevent beets or rocks from becoming jammed in between the gate and the wall extension 68 when the gate is moved from a fully-extended position back toward the vertical position.

Blocking means is also provided on the opposite end of the gate 40, which may be the same as the plate 76 but, advantageously, is a plate 80 welded to the end of the gate 40 between it and the extended portion 70. This plate 80 projects inwardly, as shown in FIGS. 1 and 4, a distance such that when the gate 40 is in the fully-extended position, the plate 80 completely covers the triangular hole that would otherwise occur between the gate 40 and the extended portion 70.

Advantageously, the plate 80 which is welded to the gate 40 has a forwardly-projecting portion 82 for the purpose about to be described.

The gate 40 is actuated by the hydraulic cylinder which has its piston rod 86 fastened to the forwardly-projecting portion 82 of the plate 80 by the yoke 88 and pin 90. The other end of the hydraulic cylinder 84 is fastened to bracket 92 by yoke 94 and pin 96.

Figure 7:
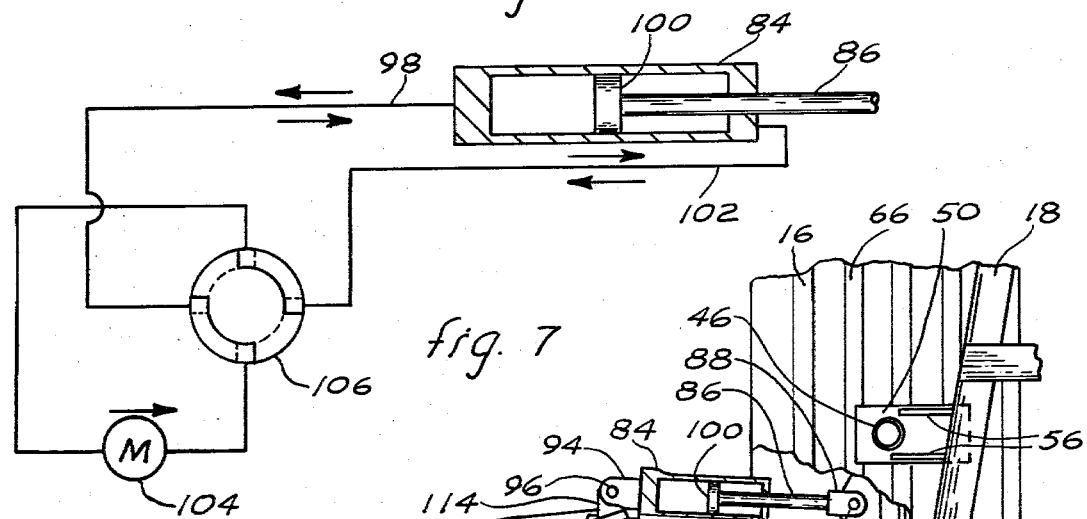
FIG. 7 is a schematic view of the operation of the hydraulic cylinder.
Figure 3:
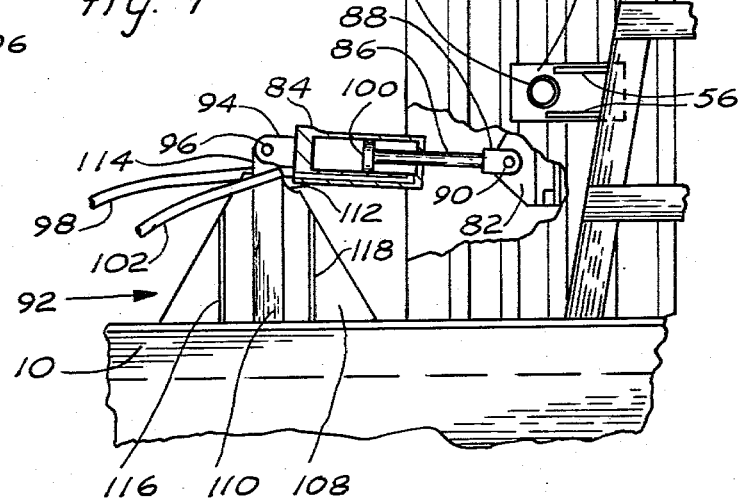
FIG. 3 is a detailed view of FIG. 1, showing the harvester modified according to the invention, looking along lines 3—3 of FIG. 5.
Figure 6:
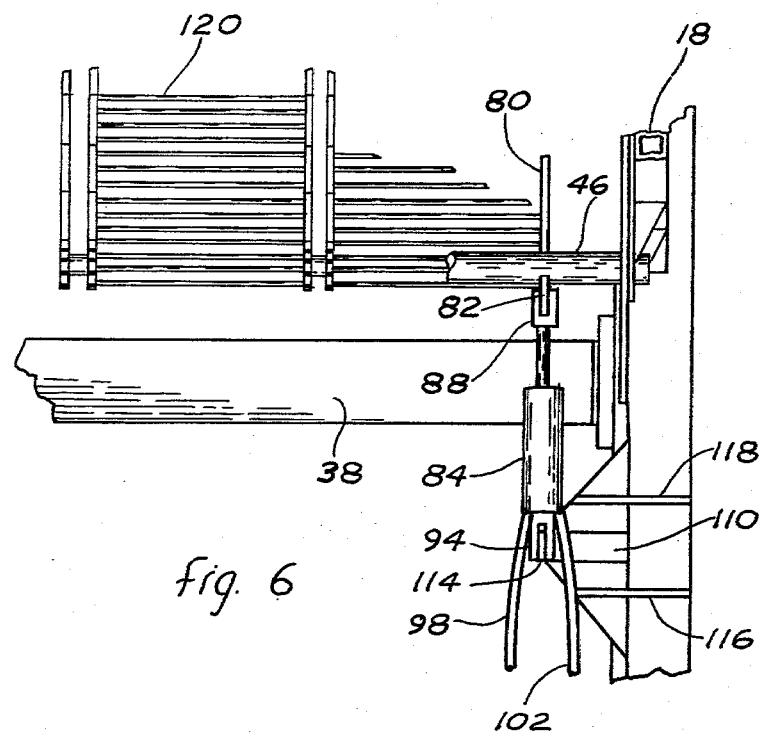
FIG. 6 is a detailed view looking along lines 6—6 of FIG. 5.

The hydraulic cylinder 84 is a double-acting piston type, as illustrated in FIG. 7, having a conduit 98 for admitting hydraulic fluid to one side of the piston 100 and a conduit 102 for admitting hydraulic fluid to the other side of the piston 100. A source of high-pressure hydraulic fluid 104 delivers hydraulic fluid to valve 106 which, in the position shown, delivers the high-pressure hydraulic fluid to conduit 98 and returns hydraulic fluid through conduit 102 back to the source of the high-pressure hydraulic fluid. When the valve 106 is moved to the position shown in dotted lines, the flow is reversed and the hydraulic fluid is delivered to conduit 102 and returned to conduit 98. When the valve is set in an intermediate position, all flow is blocked and the piston 100 is held immovable. Thus, the gate 40 can be moved from the normal position to the extreme forward position or to any intermediate position and held in any of these positions, immovable.

The bracket 92 comprises a bracket plate 108 in the shape of an isoceles triangle having its bottom welded to the transverse frame member 10. The bracket plate 108 is provided with a reinforcing narrow strip 110 which is welded to the bracket plate 108 and to the longitudinal frame member 10 and extends upwardly along the altitude of the triangle to a position substantially at the apex of the triangle. Parts of the apex of the bracket plate 108 are cut away, as shown at 112, so that the hydraulic cylinder 84 can be fastened to the top of the narrow strip 110, as shown in FIGS. 1, 3, 4, 5, and 6. The bracket plate 108 slopes inwardly to a point opposite the edge of the gate 40 and the top portion 114 of the narrow strip 110 is bent upwardly and is perforated to receive the bolt 90 which fastens the yoke 94 thereto. By having the other end of the hydraulic cylinder fastened to the projecting portion 82 of the rock deflector plate 80, the extent to which the bracket plate 108 needs to slope inwardly is minimized.

The bracket plate 108 is reinforced by plates 116 and 118 cut in the shape of scalene triangles with one of the sides which subtends the obtuse angle is welded to the frame and the other to the bracket plate 108.

The horizontal conveyor 36 is of the conventional type in which transverse rods 120 ride over sprockets 122 and 124. The forward sprockets 122 are located so that the axes thereof are parallel to the axis 42 and substantially in the same vertical plane. Thus, when the gate 40 is in the vertical position, as shown in FIG. 4, it is above the horizontal conveyor 36, but when it is in the forward position, the bottom of the gate 40 extends out beyond the sprockets 122, so that the opening between the gate and the horizontal conveyor is maximized and the beets allowed to spill over onto the transverse screw conveyors 28 substantially unhampered.

Figure 5:
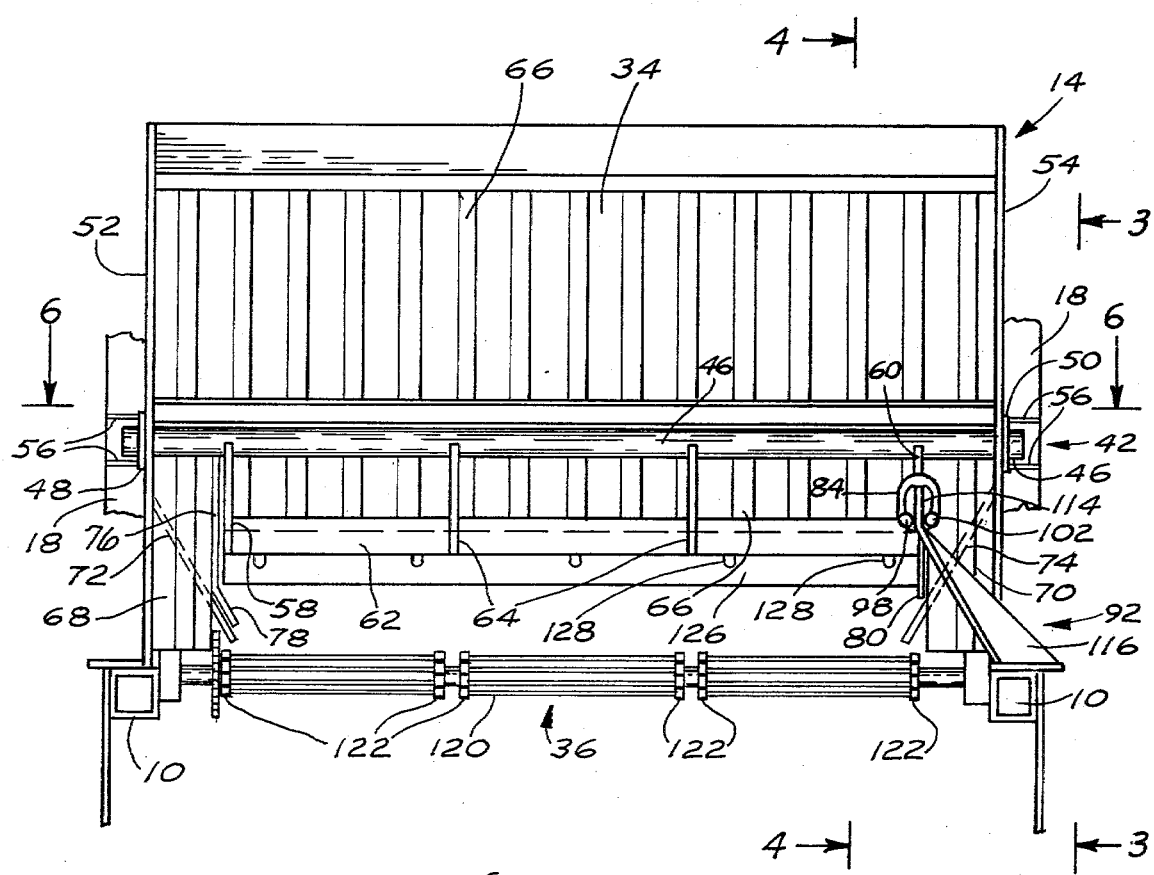
FIG. 5 is a detailed view of FIG. 1, looking along lines 5—5.

Under certain conditions, particularly when the beets are heavy and the elevator 32 cannot handle both the beets that are dug and those which are fed out of the holding tank by the conveyor 36, even when the gate is in a vertical position and the aperture is minimized, it is desirable, sometimes, further, to curtail the movement of beets from the holding tank. For this purpose, the bottom of the gate 40 is provided with a narrow strip 126 mounted along the bottom edge of the gate 40 so that it can be moved upwardly to a position even with the bottom of the gate or to a position downwardly thereof, as shown in FIGS. 1, 4, and 5. For this purpose, the narrow strip 126 is provided with a plurality of vertical slots 128 through which the narrow strip may be bolted to the bottom of the gate 40. When the bolts are at the top of the slot, the strip 126 will be substantially below the gate 40, as shown in FIG. 5, and when the bolts are at the bottom of the slots, the narrow strip 126 will be raised to a point where the bottom of it is even with the bottom of the gate 40. It will thus be seen that there is provided simple, effective, and rugged means whereby the outflow of the beets from the holding tank of a beet harvester can be controlled in accordance with the particular conditions obtaining at the time of harvesting.

It is to be understood that the invention is not to be limited to the exact details of operation or structure shown and described, as obvious modifications and equivalents will be apparent to one skilled in the art.

I claim:

1. In a beet harvesting machine of the type in which beets are dug, freed of dirt, and elevated to a truck or a holding tank, in which the holding tank has a backwardly and downwardly sloping front wall which terminates above a horizontal conveyor which, when actuated, functions to remove beets from said holding tank, the combination therewith in which the bottom portion of the front wall has the uppermost edge thereof hinged on a horizontal axis lying substantially in the plane of said front wall to provide a planar-form gate which, in its normal position, lies in the plane of said front wall and which is adapted to swing forward and backward from its normal position in the plane of said front wall to a forward position where it forms an acute angle with the vertical plane through said axis, and in which means is provided for moving said gate from one extreme position to the other and holding it in either position or in any intermediate position whereby, when said gate is moved to a vertical position, the clearance between the bottom of said gate and the top of said horizontal conveyor is reduced to a minimum and, when it is moved from that position to the extreme forward position, the clearance is maximized.

2. A beet harvesting machine according to claim 1, in which the means for moving said gate and the means for holding said gate are comprised in a hydraulic means.

3. A beet harvesting maching according to claim 2, in which said hydraulic means comprises a double-acting piston in which the piston is moved by feeding hydraulic fluid to one side and simultaneously withdrawing it from the other side and in which when the hydraulic fluid is not being fed and withdrawn, the fluid in said cylinder effectively prevents movement of the piston either way, and in which a piston rod communicates the motion of said piston to said gate, whereby said gate is held immovable in any position to which it may have been moved.

4. A beet harvesting machine according to claim 2, in which said harvester has a frame member extending along each side thereof from front to rear substantially at the level of said horizontal conveyor and in which a bracket is secured thereto which projects inwardly and upwardly to an elevation intermediate the bottom of said gate in its lowermost position and the top thereof, and in which said hydraulic means has an end fastened to said bracket and the other end fastened to said gate.

5. A beet harvesting machine according to claim 4, in which said bracket comprises a bracket plate shaped substantially as an isoceles triangle having its base secured to said frame member and its apex fastened to said hydraulic means.

6. A beet harvesting machine according to claim 5, in which said bracket plate comprises reinforcing plates shaped substantially as scalene triangles having an obtuse angle with one of the sides which subtends said obtuse angle being fastened to said braket plate and the other being fastened to said frame member, said reinforcing plates being perpendicular to said bracket plate and said frame member.

7. A beet harvesting machine according to claim 6, in which a narrow reinforcing strip is fastened to said bracket plate and extends up from said frame member to a point above the apex of said bracket plate and has means at the top thereof for fastening said hydraulic means thereto.

8. A beet harvesting machine according to claim 1, in which said horizontal conveyor extends forward to a point between the normal position of said gate and the extended position thereof.

9. A beet harvesting machine according to claim 8, in which said conveyor has sprocket means at the forward position and in which the axis of said sprocket and the axis of said gate are substantially parallel and lie substantially in the same vertical plane.

10. A beet harvesting machine according to claim 1, in which said front wall has extended portions which extend downwardly alongside of said gate when it is in the normal position so that, when the gate is in the fully-extended position, there are angular openings between said extended portions and said gate, and in which blocking means is provided for keeping said openings blocked when said gate is in any extended position beyond the normal position.

11. A beet harvesting machine according to claim 10, in which said blocking means comprises a plate fastened to an extended portion and projecting forwardly as far as said gate in its fully-extended position, and having an expanse sufficient to prevent beets or rocks from lodging in between said gate and said extended portion when the gate is swung backwardly toward its normal position.

12. A beet harvesting machine according to claim 10, in which said blocking means comprises a plate fastened to a side of said gate and projecting rearwardly when said gate is in its fully-extended position as far as the extended portion of said front wall on the same side, and having an expanse sufficient to prevent beets and rocks from being lodged in between said gate and said extended portion when the gate is swung backwardly toward its normal position.

13. A beet harvesting machine according to claim 12, in which the other extended portion has a plate fastened thereto and projecting forwardly as far as said gate in its fully-extended position, and having an expanse sufficient to prevent beets and rocks from being lodged in between said gate and said extended portion when the gate is swung backwardly toward its normal position.

14. A beet harvesting machine according to claim 13, in which the plate which is fastened to said gate has a forwardly projecting portion, comprising means for attaching the piston rod of said hydraulic means thereto.

15. A beet harvesting machine according to claim 4, in which the plate which is fastened to said gate has a forwardly projecting portion, comprising means for attaching the piston rod of a hydraulic means thereto.

16. A beet harvesting machine according to claim 1, in which said gate is provided along the bottom edge thereof with adjusting means whereby the size of the minimum aperture between said gate and said horizontal conveyor can be adjusted.

17. A beet harvesting machine according to claim 16, in which said adjusting means comprises an elongated plate fastened to the inside wall of said gate and means for setting the same in one or more positions ranging from the bottom of said gate to a position below and parallel thereto.

18. A beet harvesting machine according to claim 17, in which said plate is provided with a plurality of vertical slots and said plate is bolted to said gate through said slots, whereby the position of the plate depends on whether the plate is bolted to the gate with the bolts at the top of said slots or at the bottom thereof or at an intermediate position.

19. In a beet harvesting machine of the type in which beets are dug, freed of dirt, and elevated to a truck or a holding tank, in which the holding tank has a backwardly and downwardly sloping front wall which terminates above a horizontal conveyor which, when actuated, functions to remove beets from said holding tank, the combination therewith in which the bottom portion of the front wall is hinged on a horizontal axis lying substantially in the plane of said front wall to provide a gate adapted to swing forward and backward from its normal position in the plane of said front wall to a forward position where it forms an acute angle with the vertical plane through said axis, and in which means is provided for moving said gate from one extreme position to the other and holding it in either position or in any intermediate position whereby, when said gate is moved to a vertical position, the clearance between the bottom of said gate and the top of said horizontal conveyor is reduced to a minimum and, when it is moved from that position to the extreme forward position, the clearance is maximized, in which the means for moving said gate and the means for holding said gate are comprised in a hydraulic means, in which said hydraulic means comprises a double-acting piston, and in which said front wall has extended portions extending down along each end of said gate when it is in the normal position, said extended portions having on the rearward side thereof plates fastened thereto which slope downwardly and inwardly from the sidewalls of said tank to a position over said horizontal conveyor, whereby the beets in said holding tank are directed onto said conveyor.

20. A beet harvesting machine according to claim 19, in which a plate is fastened to the inner side of one of said extended portions between it and said gate and which extends downwardly from the top of said extended portion as far as the bottom of said gate and forwardly as far as said gate swings forward, and having an expanse sufficient to prevent beets and rocks from lodging in between said gate and said extended portion when the gate is swung backwardly toward its normal position.

21. A beet harvesting machine according to claim 12, in which a plate is fastened to an outer end of said gate adjacent the side of the extended portion adjacent thereto and which extends downwardly from the top of said gate to the bottom thereof, inwardly far enough so that when the gate is in its fully-extended position, said plate extends from said gate to said other extended portion, and forwardly far enough so that it can be engaged by the piston rod of said hydraulic means, and having an expanse sufficient to prevent beets and rocks from being lodged in between said gate and said extended portion when the gate is swung backwardly toward its normal position.

22. A beet harvesting maching according to claim 21 in which a plate is fastened to the outer end of said gate adjacent the side of the other extended portion and which extends downwardly from the top of said gate to the bottom thereof, inwardly far enough so that when the gate is in its fully-extended positon, said plate extends from said gate to said other extended portion, and forwardly far enough so that it can be engaged by the piston rod of said hydraulic means, and having an expanse sufficient to prevent beets and rocks from being lodged in between said gate and said extended portion when the gate is swung backwardly toward its normal position.

* * * * *

UNITED STATES PATENT AND TRADEMARK OFFICE
CERTIFICATE OF CORRECTION

PATENT NO. : 4,226,566

DATED : October 7, 1980

INVENTOR(S) : Gale E. Maust

It is certified that error appears in the above-identified patent and that said Letters Patent are hereby corrected as shown below:

Col. 7, line 24; "maching" should read -- machine --

Col. 8, line 42; "claim 4," should read -- claim 12, --
Col. 10, line 6; "claim 12," should read -- claim 19, --

Signed and Sealed this

Seventeenth Day of February 1981

[SEAL]

Attest:

RENE D. TEGTMEYER

Attesting Officer     Acting Commissioner of Patents and Trademarks